S. APOSTOLOFF.
ANTIFRICTION DEVICE.
APPLICATION FILED MAY 21, 1918.
1,327,895.
Patented Jan. 13, 1920.
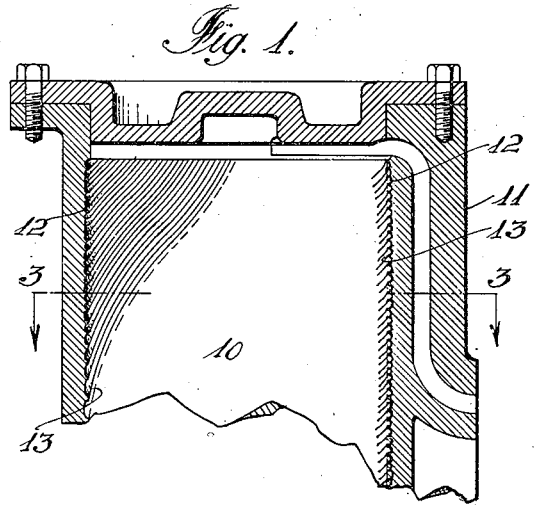
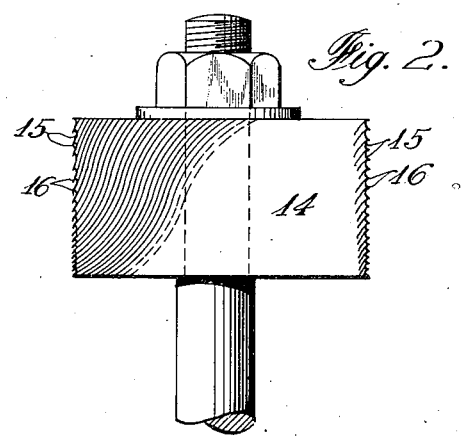
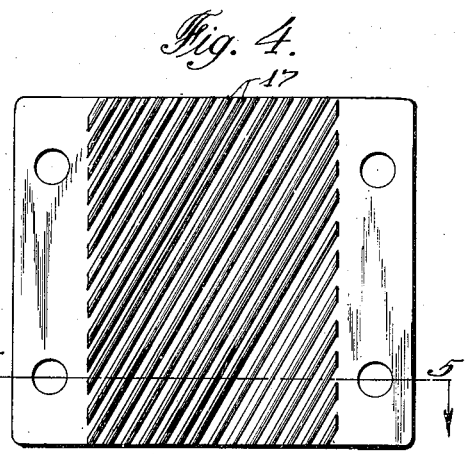
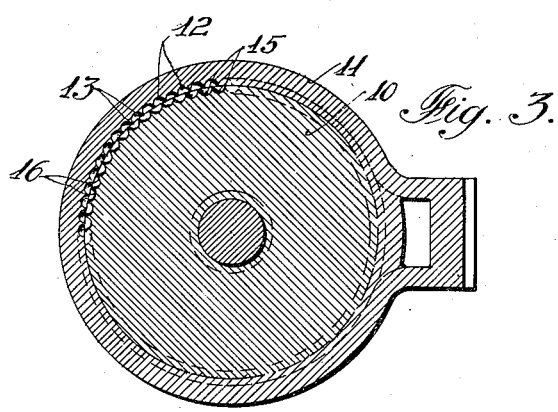
Inventor
Serge Apostoloff
By his Attorney
William Richards

UNITED STATES PATENT OFFICE.

SERGE APOSTOLOFF, OF NEW YORK, N. Y.

ANTIFRICTION DEVICE.

1,327,895.    Specification of Letters Patent.   Patented Jan. 13, 1920.

Application filed May 21, 1918. Serial No. 235,884.

*To all whom it may concern:*

Be it known that I, SERGE APOSTOLOFF, a subject of the King of Great Britain and Ireland, residing at New York, in the county and State of New York, have invented a certain new and useful Improvement in Antifriction Devices, of which the following is a specification.

This invention relates to anti-friction devices, and has for its object to construct such devices in forms that will greatly minimize if not entirely overcome friction between opposing moving parts; that will be applicable for use in any type, form, or size of such structures, including the pistons and cylinders of engines, pumps, etc.; and, that will be economical in construction, easy to assemble, and efficient in use.

A further object of my invention is to so construct such devices that additional parts, such as the piston rings in engine cylinders, may be dispensed with.

A still further object is to form a substantially vapor, gas and liquid tight bearing for moving parts of machinery.

These and other objects of my invention are set forth in the following specification, and shown in the accompanying drawings, which form a material part of this disclosure, and in which:—

Figure 1 is a partial, central, longitudinal sectional view of an engine cylinder, showing my invention applied thereto;

Fig. 2 is a side elevational view of a piston head constructed according to my invention;

Fig. 3 is a transverse sectional view of an assembled cylinder and piston head; and, Figs. 4 and 5 are respectively a partial plan and a transverse sectional view of one member of a flat bearing showing a modified form of the invention.

In carrying out my invention, and referring now more particularly to engines, pumps, and similar structures, the bore 10 of the cylinder 11 is formed with a series of grooves or depressions 12, which are disposed tangentially to the plane of the said bore. These grooves or depressions may be arranged spirally or otherwise in the bore, and are preferably formed parallel with each other and extending in the same direction. The apices 13 of the meeting walls of said grooves form the opposing surfaces of one member of my bearing.

The piston head 14 is also formed with exterior, tangentially arranged grooves or depressions 15, which are arranged so that they run in an opposite direction to that of the grooves or depressions 12, with which they are adapted to operate, the apices 16 of the meeting or intervening walls of the grooves or depressions 15 forming the opposing surfaces of the other member of the bearing, these walls thus terminating at their tops in linear edges.

The grooves or depressions above referred to may be quite shallow, and are preferably arranged closely together, and the apices of their meeting walls are finished true to the bore so that the piston head may fit the cylinder closely to make a tight bearing therewith.

As the grooves or depressions of the bore of the cylinder extend in an opposite direction to those of the piston head it will be obvious that the lines of the two series of grooves cross each other, so that a labyrinth is formed by the grooves between the cylinder and piston head which will effectually prevent leakage of gas, vapor, or liquid, between the last named parts while operating.

In Figs. 4 and 5 I show a modification of my invention in which, instead of cutting or forming grooves in the parts, I employ wires 17, which are similarly arranged to the grooves hereinbefore described, to form the opposing bearing surfaces, the interstices between the wires forming the grooves or depressions. The wires may be secured in place in any desired manner, as for example by welding, cementing, or otherwise.

A bearing formed in this manner operates efficiently, the apices of the meeting walls of the opposing grooves or depressions sliding the one upon the other easily and freely, with little or no friction, and with practically no liability to leakage between the parts for the reasons above stated.

It will also be observed that the grooves or depressions serve admirably for the purpose of holding lubricants, and especially solid lubricants such as graphite or mica, preventing the lubricants from dropping down to the bottom of the cylinder.

It will also be obvious that the gas or vapor passing into the groove labyrinth forms a cushion between the piston and the cylinder wall, which aids in holding the piston in its true operative position.

Having now described my invention what

I claim as new and desire to secure by Letters Patent is:—

1. A bearing for movable surfaces comprising a pair of contacting members, the opposing faces of which are provided with grooves, the grooves of said members being arranged closely together to cause their intervening walls to terminate at their tops in substantially linear edges, the grooves of one member running crosswise to those of the other member.

2. A bearing for movable surfaces comprising a pair of contacting members, the opposing faces of which are formed with spirally arranged grooves of substantially semi-circular cross section, the grooves of each member being arranged closely together to cause their intervening walls to terminate at their tops in substantially linear edges.

3. A bearing for movable surfaces comprising a pair of contacting members, the opposing faces of which are formed with spirally arranged grooves of substantially semi-circular cross section, the grooves of each member being arranged closely together to cause their intervening walls to terminate at their tops in substantially linear edges, the grooves of one member running crosswise to those of the other member.

In testimony whereof, I have signed my name to this specification, this 7th day of May, 1918.

SERGE APOSTOLOFF.